United States Patent [19]

Seiler

[11] 3,884,995
[45] May 20, 1975

[54] NON-FLOCCULATED DISPERSIONS OF PERFLUOROOLEFIN POLYMER PARTICLES IN ORGANIC LIQUID

[75] Inventor: Henry K. Seiler, Woodbury, N.J.

[73] Assignee: E. I. du Pont de Nemours & Company, Wilmington, Del.

[22] Filed: July 18, 1973

[21] Appl. No.: 380,335

[52] U.S. Cl......... 260/900; 260/31.2 R; 260/31.2 N; 260/31.4 R; 260/32.8 R; 260/32.8 N; 260/33.4 F; 260/33.6 F; 260/33.8 F; 260/34.2
[51] Int. Cl. ........................................... C08f 29/22
[58] Field of Search ............ 260/900, 876 R, 876 B, 260/33.4 F, 33.6 F

[56] References Cited
FOREIGN PATENTS OR APPLICATIONS
1,186,819  4/1970  United Kingdom................. 260/900
1,064,840  4/1967  United Kingdom Primary Examiner—Murray Tillman
Assistant Examiner—C. J. Seccuro

[57] ABSTRACT

A process for preparing a dispersion in an organic liquid of particles of perfluoroolefin polymer which comprises:

a. contacting
   1. an aqueous dispersion of particles of perfluoroolefin polymer, the polymer bearing functional groups and the dispersion being substantially free of ionic contaminants that would materially interfere with the reaction described in 3 below,
   2. organic liquid, and
   3. stabilizer which is a polymer that is soluble in the organic liquid and bears functional groups that will interact with those born by the perfluoroolefin polymer, the stabilizer being present in such an amount and the contacting being done under conditions in which at least some of the functional groups of the perfluoroolefin polymer and the functional groups of the stabilizer interact thereby causing at least some of the perfluoroolefin polymer particles that have interacted with the stabilizer to be transferred to the organic liquid, and b. separating the organic liquid containing perfluoroolefin polymer particles from the water.

9 Claims, No Drawings 3,884,995

NON-FLOCCULATED DISPERSIONS OF PERFLUOROOLEFIN POLYMER PARTICLES IN ORGANIC LIQUID

BACKGROUND OF THE INVENTION

This invention relates to a method of producing essentially non-flocculated dispersions of perfluoroolefin polymer particles in organic liquid.

This invention also relates to essentially non-flocculated dispersions of perfluoroolefin polymer particles in organic liquid.

One known method of producing dispersions of perfluoroolefin polymer in organic liquid is to grind or mill perfluoroolefin polymer particles from which the water has been removed in the presence of organic liquid. Such methods however produce dispersions wherein the perfluoroolefin polymer particles are relatively large, that is, about 1 to 10 microns in radius or even larger. Since the particles are of this size, they tend to settle.

British Pat. No. 1,186,819 discloses that perfluoroolefin polymer particles can be stabilizied by admixing perfluoroolefin particles from which the water has been removed with a stabilizer in the presence of an organic liquid. It has been found however that since the perfluoroolefin particles are dry, i.e., the water has been removed from the aqueous dispersion from which they are produced, the particles tend to be flocculated and therefore exist in clumps having an average particle radius of about 1–3 microns or even larger. The particles in the organic liquid also have about this size.

It would be desirable to be able to produce essentially non-flocculated dispersions of perfluoroolefin polymer particles in organic liquid, that is, wherein the particles of perfluoroolefin polymers are essentially of the same size in the organic liquid as they are in the aqueous dispersion in which they are produced.

SUMMARY OF THE INVENTION

A process for preparing a dispersion in an organic liquid of particles of perfluoroolefin polymer which comprises:

a. contacting
  1. an aqueous dispersion of particles of perfluoroolefin polymer, the polymer bearing functional groups and the dispersion being substantially free of ionic contaminants that would materially interfere with the reaction described in 3 below,
  2. organic liquid, and
  3. stabilizer which is a polymer that is soluble in the organic liquid and bears functional groups that will interact with those born by the perfluoroolefin polymer, the stabilizer being present in such an amount and the contacting being done under conditions in which at least some of the functional groups of the perfluoroolefin polymer and the functional groups of the stabilizer interact thereby causing at least some of the perfluoroolefin polymer particles that have interacted with the stabilizer to be transferred to the organic liquid, and b. separating the organic liquid containing perfluoroolefin polymer particles from the water.

There is also provided by this invention dispersions in organic liquid of essentially non-flocculated particles of perfluoroolefin polymer produced by the above process.

DESCRIPTION OF THE INVENTION

Perfluoroolefin Polymers

Perfluoroolefin polymers suitable for use in this invention include polytetrafluoroethylene, and copolymers of tetrafluoroethylene (TFE) and hexafluoropropylene (HFP). Methods for preparing such copolymers are described in U.S. Pat. No. 2,946,763 to M. I. Bro, et al. the disclosure of which is hereby incorporated by reference. Methods for preparing the polytetrafluoroethylene polymers are described in the Journal of Polymer Science, Volume 38, pages 289–295 (1959) the disclosure of which is hereby incorporated by reference.

Suitable copolymers for use in this invention include TFE/HFP copolymers in TFE/HFP weight ratios of from 5–95/5–95. The preferred copolymers, because of the stability of the dispersions formed with them, are the 50–95/5–50 TFE/HFP copolymers. Even more preferred are the 75–95/5–25 TFE/HFP copolymers. Most preferred are the 93–95/5–7, the 84–88/12–16 and the 75–80/20–25 copolymers, specifically the 95/5, 85/15 and 75/25 copolymers. The 1–5/95–99 copolymers can also be used, as can those whose TFE/HFP monomer ratios range from 95–100/0–5.

Preferably, the perfluoroolefin polymer will have a molecular weight of at least about 20,000. Often such perfluoroolefin polymers will have an average molecular weight of about 100,000–500,000 and can be up to about 1–3 million or more.

Such polymers are often produced in aqueous media and exist as particles having an average particle radius* of about 0.01 to about 3 microns, with no more than 50% of these particles being larger than 3 microns in radius. Preferred are particles having an average particle radius of about 0.01–3 microns, more preferred are particles having an average radius of about 0.01–1.0 microns, more especially preferred are particles having an average radius of 0.05–0.5 micron and most especially preferred are particles having an average radius of about 0.08–0.125 micron.

*Measured by direct microscopic examination at a magnification of about 750 diameters. Particle dimensions can be measured by comparison with an eye-piece scale or by direct comparison with markings on a calibrated slide. Particle size can also be measured by the angular dependent light scattering method described by Aughey, et al. in J. Opt. Soc. Am., 44, 833 (1954). Particles smaller than about 1.0 microns can be measured by electron microscopy.

The perfluoroolefin polymers usually carry acid groups as initiator residues such as —COOH or —SO₃H. Most often the acid groups will be —COOH.

Copolymers of TFE/HFP wherein the HFP is present in an amount of at least about 20% by weight have been found to carry sufficient acid groups as initiator residues to enable a sufficient amount of the stabilizer to react with them to thereby allow the transfer of such TFE/HFP copolymer to the organic liquid.

If the perfluoroolefin polymer contains less than about 20% by weight HFP such polymer may carry fewer acid groups and therefore the reaction with the stabilizer and the transfer to the organic liquid may be somewhat slower. To increase the rate of transfer for such perfluoroolefin polymer, or to increase the rate of transfer of the perfluoroolefin polymers generally, one can include in the aqueous dispersion of such perfluoroolefin polymer low molecular weight (i.e., below about 20,000 and preferably about 3,000–5,000) perfluoroolefin polymers. These low molecular weight perfluoroolefin polymers can be produced by modifying the normal method of polymerization of the perfluoroolefin polymers to optimize the production of the low molecular weight species. The modifications can include these methods known in the art to optimize the production of low molecular weight species such as using an excess amount of initiator (such as for example about 5–100 times the amount that is ordinarily used) and using lower pressure than is ordinarily used.

The amount of the low molecular weight perfluoroolefin polymers required for an acceptable rate of transfer can be readily determined by adding various amounts of the low molecular weight perfluoroolefin polymer to the aqueous dispersion of perfluoroolefin polymer and determining whether a suitable rate of transfer is obtained. Often the amount of low molecular weight perfluoroolefin polymer used will be about 0.1 to 25% by weight based on the weight of the perfluoroolefin polymer.

Different functional groups can be built into the perfluoroolefin polymer by post reacting it with a multiple functional compound. The multiple functional compound has at least two functional groups per molecule (and up to about 10–20 and preferably up to about 3 or 4 functional groups) at least one of which will interact with the acid groups born by the perfluoroolefin polymer. Functional groups that interact with the acid groups of the perfluoroolefin polymer include primary, secondary and tertiary amine groups, glycidyl groups, hydroxyl groups and aziridinyl groups. The remaining groups on the dual functional compound can be those selected from the group above listed and —COOH and —SO$_3$H. Note that the functional groups of the multiple functional compound can be the same or different from each other. Thus, in accordance with this post reaction technique, one can produce perfluoroolefin polymer particles bearing functional groups such as —OH, glycidyl, amino, heterocylic aromatic bases or aziridinyl.

Examples of multiple functional compounds include glycols, diamines, polyetherglycols, etc. Specific examples include $C_2$–$C_{20}$ glycols such as ethylene glycol, propylene glycol, etc.; $C_2$–$C_{20}$ diamines such as ethylene diamine, propylene diamine, butylene diamine, hexamethylene diamine, etc., polyether glycols of $C_2$–$C_{20}$ such as polytetramethyleneether glycol, etc.

Stabilizers

The stabilizers are synthetic organic polymers bearing reactive functional groups on or pendant from their polymer chains. By synthetic organic polymer is meant a linear or branched homopolymer, a linear or branched random or ordered copolymer of a graft copolymer or a block copolymer. The polymer can be an addition or condensation polymer.

The reactive functional groups can be acid groups such as —COOH, —SO$_3$H, —SO$_4$H, —PO$_4$H$_2$, —PO$_4$H and —PO$_3$H$_2$. Also, the reactive functional groups can be organic bases such as primary, secondary or tertiary amines, including those having the formula

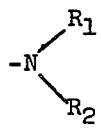

wherein $R_1$ and $R_2$ may be aryl, aralkyl, alkyl, cycloalkyl or hydrogen or together may form a ring structure which may contain, if desired, a hetero atom. The organic bases include —NH$_2$, —NHCH$_3$, —NHCH$_2$CH$_3$, —N(CH$_3$)$_2$, —N(CH$_2$CH$_3$)$_2$, di-isopropyl amino, dihexyl amino, morpholino, piperidino, N-methylbenzyl amino, and N-methylphenyl amino. Other organic bases include quaternary ammonium bases, substituted guanidine, substituted dicyandiamide and substituted pyridine. The reactive functional groups also can be glycidyl groups, hydroxyl groups or —COOH groups that have been iminated, i.e., reacted with an alkylene imine such as ethylene imine or propylene imine.

Of course, any of the above groups described in the immediately preceding paragraph can be born by the perfluoroolefin polymer, provided that the functional groups carried by the perfluoroolefin polymer and the functional groups carried by the stabilizer are selected so that they will interact when brought into intimate contact with each other. When it is said that the functional groups of the stabilizer and the functional groups of the perfluoroolefin polymer interact, by this it is meant that the associative forces between such groups are strong enough to cause the stabilizer to be bonded to the perfluoroolefin polymer. Preferably, the bond energy between the functional groups will be at least as great as the bond energy between a carboxylic acid group and an amine group when they are in strong specific interaction in an inert organic liquid ester.

The interaction between the stabilizer and the perfluoroolefin polymer can be the result of protolytic reaction between the two groups such as that resulting from the reaction between an acid group and a basic group. By basic group is meant a species having a tendency to add on a proton and by acidic group is meant a species having a tendency to lose a proton. Such protolytic reactions include those commonly referred to as hydrogen bonding. In the stronger protolytic reactions, the bond energy is the result of specific interaction between separate fixed charges, one in one functional group and another in the complementary functional group. In another embodiment, the interaction can be between a pair of opposite charges, that is, a dipole in one functional group and a pair of opposite charges, i.e., a dipole in the complementary functional group.

A preferred method of producing the stabilizer is to copolymerize ethylenically unsaturated monomers bearing functional groups with ethylenically unsaturated monomers not bearing functional groups.

Illustrative of monomers bearing functional groups are N,N-dimethylaminoethyl methacrylate, t-butylaminoethyl methacrylate, aminoethyl vinyl ether, aminoethyl methacrylate, 4-vinyl pyridine, vinyl pyrrolidone, acrylic acid or methacrylic acid that has been iminated, that is, reacted with an alkylene imine such as ethylene imine or propylene imine, 3-($\beta$methacryloxyethyl)-2,2-spirocyclohexyloxazolin, glycidyl acrylate, glycidyl methacrylate, aziridinyl acrylate, aziridinyl methacrylate, acrylic acid, methacrylic acid, crotonic acid, itaconic acid and the like. Preferred are monomers that bear —NH$_2$ groups. Especially preferred monomers are the foregoing that are underlined.

Illustrative of the ethylenically unsaturated monomers not bearing functional groups include esters of acrylic acid with alkanols having about 1 through 18 carbon atoms, such as methyl acrylate, ethyl acrylate, propyl acrylate, isopropyl acrylate, the various butyl acrylates, cyclohexyl acrylate, 2-ethylhexyl acrylate, n-hexyl acrylate, n-octyl acrylate, t-octyl acrylate, the various decyl acrylates, lauryl acrylate, hexadecyl acrylate, stearyl acrylate, and the like; esters of methacrylic acid with alkanols having about 1 through 18 carbon atoms, such as methyl methacrylate, ethyl methacrylate, propyl methacrylate, isopropyl methacrylate, the various butyl methacrylates, cyclohexyl methacrylate, n-hexyl methacrylate, 2-ethylhexyl methacrylate, n-octyl methacrylate, t-octyl methacrylate, the various decyl methacrylates, lauryl methacrylate, hexadecyl methacrylate, stearyl methacrylate and the like; vinyl esters of fatty acids having about 2 through 20 carbon atoms such as vinyl acetate, vinyl propionate, vinyl butyrate, vinyl valerate, vinyl hexanote, vinyl octonate, vinyl α,α-dimethyloctonate, vinyl oleate, vinyl laurate, vinyl palmitate, vinyl stearate and the like; styrene, chloroprene, vinyl chloride, vinylidene chloride, acrylonitrile, butadiene, 1-butene, methacrylonitrile, vinyl toluene, chlorostyrene, dichlorobutadiene, ethylene, propylene, isobutene and the like. Mixtures of the foregoing can be used. Preferred are esters of acrylic acid or methacrylic acid with alkanols of 12–18 carbon atoms; especially preferred is stearyl methacrylate.

The stabilizers can be formed by conventional free-radical polymerization techniques that are well known. Generally, any free-radical catalyst that can be used for the bulk, solution, emulsion, or dispersion polymerization of the monomers herein enumerated can be employed. Ordinarily, free-radical catalysts of the azo or peroxide types will be used. Examples include benzoyl peroxide, lauroyl peroxide, acetyl peroxide, cumene hydroperoxide, paramenthane hydroperoxide, azodiisobutyronitrile, dimethyl azodiisobutyrate, azobis-(isobutyronitrile) and the like. The catalyst will be used in ordinary amounts which often will be about 0.05–3% by weight of total monomer.

Preferably, to produce the stabilizers, the monomers and free-radical catalyst along with a suitable organic liquid are placed in a reaction vessel. Sufficient heat is applied to maintain the mixture at its reaction temperature which often will be in the range of 30°–150°C. until the reaction is complete which often will take about ½ to 24 hours. Preferably, a dispersion or solution polymerization system will be used.

Preferably the stabilizer should have a molecular weight of about 1,000–10,000 but can be up to 35,000 or even 100,000 or higher such as 1–3 million.

Stabilizers can also be prepared in accordance with the method described in U.S. Pat. No. 3,390,206, the disclosure of which is hereby incorporated by reference. Such patent describes a method for preparing addition polymer having essentially no unsaturated groups in the chain which are terminated by only one terminal functional group selected from the group consisting of carboxyl, hydroxyl, amine and substituted amine. Such polymers can be used directly as the stabilizer or they can be subsequently condensed with monomers or other polymers having functional groups that will interact with the functional groups carried by the perfluoroolefin polymer.

Methods of making graft copolymer stabilizers are disclosed in U.S. Pat. Nos. 3,317,635; 3,232,903 and 3,218,287, the disclosures of which are hereby incorporated by reference. Reactive groups can be incorporated in such graft copolymer stabilizers by using in the polymerization of such graft copolymers monomers which carry functional groups that will interact with the functional groups carried by the perfluoroolefin polymer.

Preferably, the stabilizer should contain about 0.1–80%, more preferably about 0.1–25% and most preferably about 0.1–10% by weight of functional groups.

The stabilizer should be soluble in the organic liquid. By soluble is meant a stabilizer at least about 0.5 gram of which dissolves in 100 grams of the organic liquid being used, at room temperature, to form a single phase.

Organic Liquid

Suitable organic liquids include naphthenes, gasolines, aromatic hydrocarbons, aliphatic hydrocarbons, halogenated hydrocarbons, alcohols, esters, ethers, ketones and the like. Examples of organic liquids include pentane, n-hexane, cyclohexane, n-heptane, n-octane, isoctane, benzene, xylene, mineral spirits, gasoline, terpenes, solvent naphthas of aromatic aliphatic or naphthenic character, VM and P naphtha, alkyl benzenes wherein the alkyl group or groups have from 1 to 4 carbon atoms, octane isomers, petroleum ethers, chloroform, carbon tetrachloride, chlorobenzene, acetone, methyl ethyl ketone, methyl isobutyl ketone, ethyl acetate, butyl acetate, ethylene glycol monoethyl ether acetate, diethylene glycol monobutyl ether acetate, ethanol, isopropanol, butyl alcohol, cyclohexanol, diacetone alcohol, 2-ethyl hexanol, or mixtures of any of the foregoing.

The organic liquid can also be a mineral oil such as lubricating oil. The lubricating oils can be, for example, those used in the crank case of internal combustion engines, those used as gear lubricants, bearing lubricants or the like. The lubricanting oils can also be very viscous, i.e., greases. The oil can be parafinic or naphthenic or mixtures thereof. The oil can contain additives such as viscosity index improver, sludge dispersants, thickeners, etc.

Process

The perfluoroolefin polymers are often produced in an aqueous media. Such aqueous media can contain ionic contaminants that may interfere with the reaction of the stabilizer and the perfluoroolefin polymer. These ionic contaminants can be, for example, low molecular weight fluoro-acids, $SO_4^=$, $F^-$, $NH_4^+$ and $Fe^{+++}$.

The ionic contaminants can be removed by any suitable technique including those known for removing ions of the foregoing types. The following is a suitable technique.

1. The aqueous dispersion of perfluoroolefin polymer is treated with $BaCo_3$ and $CaCo_3$ to remove some of the $F^-$, $SO_4^=$ and low molecular weight fluoroacids.

2. The treated dispersion of step 1 is treated with a strong acid ion exchange resin (such as "IR–120," available from Rohm & Haas Co.) to remove $NH_4^+$ ions and $Fe^{+++}$ ions.

3. The treated dispersion of step 2 is treated with a weak base ion exchange resin (such as "IR–45," available from Rohm & Haas Co.) to remove anions that were not removed by step 1.

4. The treated dispersion of step 3 is treated with a strong acid ion exchange resin such as "IR–120" to remove any remaining traces of $NH_4^+$ ions.

After the dispersion has been treated to remove ionic contaminants, it is contacted with stabilizer and organic liquid.

Preferably, stabilizer in the amount of at least about 10% by weight (based on the weight of perfluoroolefin polymer) should be used. More preferably, one will use about 12.5–18% of stabilizer and most preferably about 15%. Higher than the foregoing amounts, for example, up to about 50%, 100% or even 400% or more, of stabilizer can be used but it is believed that no additional benefits will be obtained.

Enough organic liquid should be used so that the perfluoroolefin copolymer particles can be readily dispersed therein. However, if too much organic liquid is used, the water may become emulsified therein and thereby make it difficult to obtain a separation of the oil phase and water phase after contacting. Generally, it has been found that for optimum efficiency one can use about one volume of oil: about 4 to 12 volumes of water and preferably about 1 volume of oil to about 8 volumes of water.

The contacting can be any suitable method such as mixing, stirring, shaking, agitating, milling, etc. Any method is suitable as long as it allows for the intimate contacting of the organic liquid, stabilizer, perfluoroolefin polymer particles and water.

Preferably, for maximum efficiency, the contacting should continue until essentially all of the perfluoroolefin polymer particles have been transferred to the organic liquid. This can be determined simply by analyzing the water for perfluoroolefin polymer particles. However, if desired, the contacting can continue for the length of time that will produce the level of perfluoroolefin polymer in the organic liquid that is desired. Often the admixing will take place for about 0.1–24 hours, and preferably 0.5–10 hours.

After the above contacting (which causes the functional groups on the perfluoroolefin polymer to interact with the functional groups on the stabilizer which thereby results in the perfluoroolefin polymer particles to be transferred to the organic liquid), the water is separated from the organic liquid.

One suitable separation method (which is the preferred one) is to allow the oil and water to form separate phases and then decant the water. Up to about 90% of the total water can be decanted in this manner. Then additional organic liquid can be added, if desired, to give the final desired concentration of perfluoroolefin polymer in the organic liquid. Finally, the remaining water can be removed by any suitable means such as distillation, vacuum distillation, or azeotropic distillation (such as with the use of benzene).

Another method of removing the water is to simply boil off the water. If desired, azeotropic distillation can be used. Although this method is suitable, it is more expensive than the foregoing decantation — distillation technique since all of the water must be removed by boiling.

Still another method of removing the water is the use of a centrifuge.

The dispersions of this invention can contain about 0.1 to about 80% by weight, based on the total weight of the dispersion, of perfluoroolefin polymer particles.

Utility

When the perfluoroolefin polymer particles are dispersed in a lubricating oil or a gear oil, they impart improved anti-wear properties and extreme pressure lubricity properties (i.e., the ability of a lubricant to still function as a lubricant even though it is subjected to extreme pressure, such as gears under load). It has been found that about 0.1–10% and preferably about 0.2–6% by weight perfluoroolefin polymer particles (based on the weight of the oil) is beneficial.

When the perfluoroolefin polymer particles are dispersed in organic liquid that is of the nature used for a paint media, coating compositions result that are useful as paints. Such compositions can contain additives ordinarily used in paints such as pigments, plasticizers, stabilizers, etc.

The following Examples illustrate the invention. All parts and percentages are by weight unless other specified.

EXAMPLE 1

1. A stabilizer which was a random copolymer of stearyl methacrylate and t-butyl aminoethyl methacrylate in a weight ratio of 95/5 respectively and having a molecular weight of about 5,000 was prepared using the following technique. 950 parts stearyl methacrylate and 50 parts t-butyl aminoethyl methacrylate were added to 250 parts of methyl ethyl ketone containing 20 parts of azobisisobutyronitrile. The foregoing mixture was refluxed for about 3 hours followed by cooling. The methyl ethyl ketone contained about 76% by weight polymer solids.

2. An aqueous dispersion of perfluoroolefin polymer was made in accordance with the method described in Bro, et al. U.S. Pat. No. 2,946,763. The perfluoroolefin polymer was made from 20% by weight hexafluoropropylene and 80% by weight tetrafluoroethylene. The perfluoroolefin polymer dispersion was treated to remove ionic contaminants using steps 1 through 4 set forth under the heading in the specification "Process." The perfluoroolefin polymer dispersion contained about 13.9% by weight polymer solids.

The following were placed in a vessel:

| Ingredient | Parts |
|---|---|
| (1) Aqueous dispersion of perfluoroolefin polymer (described above) | 91.4 |
| (2) Stearyl methacrylate/t-butylaminoethyl-methacrylate polymer stabilizer in methyl ethyl ketone (described above) | 2.5 |
| (3) Solvent extracted paraffinic mineral oil having a viscosity of 77 Sabolt Universal Seconds at 100°F. and having a viscosity index of 90 | 6.5 |

Then the ingredients were stirred for 1 hour at 1,150 revolutions per minute.

After the above stirring, the admixture was allowed to settle which resulted in the formation of two phases, an oil phase and a water phase. The water phase was decanted which removed about 67% by weight of the original water. Examination of the decanted water revealed no detectable perfluoroolefin polymer.

The oil phase was then azeotropically distilled with benzene to remove the remaining water. The result was a viscous blue oil containing about 41.4% by weight perfluoroolefin polymer (HFP/TFE;20/80). Examination of the dispersion under an electron microscope revealed that essentially all particles of the perfluoroolefin polymer had a diameter of 0.20 microns. The dispersion exhibited excellent stability and resistance to settling.

The dispersion was diluted with the above paraffinic mineral oil to 0.2% perfluoroolefin content. The extreme pressure properties of this dispersion was compared to the paraffinic mineral oil alone and to the paraffinic mineral oil containing 0.03% of the polymeric stabilizer using the Shell Four Ball Test (Federal Test Method Standard No. 791a Method 6503). It was found that the paraffinic mineral oil containing the polymeric stabilizer exhibited the same properties as the paraffinic oil (weld point of 71 kilograms and mean Hertz load of 6.6). However, the paraffinic oil containing both the perfluoroolefin polymer and stabilizer exhibited greatly improved extreme pressure properties (weld point of 158 kilograms and mean Hertz load of 19.5) compared to the paraffinic oil or paraffinic oil containing the stabilizer.

EXAMPLE 2

The following ingredients were placed in a vessel:

| Ingredient | | Parts |
|---|---|---|
| (1) | Aqueous dispersion of perfluoroolefin polymer (same as that used in Example 1 but having 13.2% polymer solids) | 89.4 |
| (2) | Stearyl methacrylate/t-butylaminoethyl methacrylate polymer stabilizer in methyl ethyl ketone (same as used in Example 1) | 8.4 |
| (3) | R-60-108 fully formulated reference gear oil (base oil plus 8% gear oil additives) | 2.2 |

The above ingredients were stirred for 5 hours at 1,000 revolutions per minute.

After the mixture had settled the water phase was decanted which removed 50% of the original water.

Then the oil was azeotropically distilled with benzene to remove the remaining water. The resulting dispersion contained 55.6% polymer solids.

The dispersion was diluted to 6.0% perfluoroolefin polymer by addition of RG–108 gear oil and was compared to RG–108 gear oil alone using the Coordination Research Council Test CRC-L-42-957. The oil containing the 6% perfluoroolefin polymer exhibited surprisingly better results than the oil alone.

EXAMPLE 3

The process of the foregoing Examples can be repeated with the exception that methyl ethyl ketone is used as the organic liquid.

The invention claimed is:

1. A process for preparing a dispersion in an organic liquid of particles of perfluoroolefin polymer which comprises:
   A. contacting
      1. 4–12 volumes of an aqueous dispersion of particles of perfluoroolefin polymer consisting essentially of polymers of tetrafluoroethylene and copolymers of tetrafluoroethylene and hexafluoropropylene the polymer bearing functional groups and the dispersion being substantially free of ionic contaminants that would materially interfere with the reaction described in 3 below,
      2. one volume of an organic liquid immiscible with water, and
      3. at least about 10% by weight, based on weight of perfluoroolefin polymers, of a stabilizer which is a polymer formed from 99.9–20% by weight, based on the total weight of the stabilizer, of monomers selected from the groups consisting essentially of esters of acrylic acid or methacrylic acid with alkanols of $C_1$–$C_{18}$, vinyl esters of fatty acids having 2–20 carbon atoms, styrene, acrylonitrile, methacrylonitrile and mixtures of the foregoing and 0.1–80% by weight, based on the total weight of the stabilizer, of monomer bearing functional groups that will interact with those born by the perfluoroolefin polymer, the stabilizer being present in such an amount and the contacting being done under conditions in which some of the functional groups of the perfluoroolefin polymer and the functional groups of the stabilizer interact thereby causing at least some of the perfluoroolefin polymer particles that have interacted with the stabilizer to be transferred to the organic liquid,
   B. decanting up to 95% of the total water present the said percentage of the total water having formed into a separate phase, and
   C. separating the organic liquid containing perfluoroolefin polymers particles from the remaining water.

2. The process of claim 1 wherein the stabilizer is present in an amount of at least 10% by weight based on the weight of the perfluoroolefin polymer.

3. The process of claim 1 wherein the functional groups born by the perfluoroolefin polymer and the stabilizer are selected from the group consisting essentially of —COOH, —$SO_3H$, primary amines, secondary amines, tertiary amines, glycidyl, hydroxyl, heterocyclic aromatic bases and iminated —COOH groups.

4. The process of claim 1 wherein the perfluoroolefin polymer is a blend of perfluoroolefin polymer having a molecular weight of at least 20,000 and an amount of perfluoroolefin polymer having a molecular weight of less than 20,000 that is sufficient to cause the transfer of at least some of each of such perfluoroolefin polymers to the organic liquid.

5. The process of claim 4 wherein the perfluoroolefin polymer having a molecular weight of less than 20,000 is present in an amount of about 0.1–25% by weight, based on the weight of the perfluoroolefin polymer having a molecular weight of greater than 20,000.

6. The process of claim 1 wherein the monomers bearing functional groups forming the stabilizer are selected from the group consisting essentially of N,N-dimethylaminoethyl methacrylate, t-butylaminoethyl methacrylate, aminoethyl vinyl ether, aminoethyl methacrylate, 4-vinyl pyridine, vinyl pyrrolidine, acrylic acid or methacrylic acid that has been iminated, 3-($\beta$-methacryloxyethyl)-2,2-spirocyclohexyloxyazolidine, glycidyl acrylate, glycidyl methacrylate, aziridinyl acrylate, aziridinyl methacrylate, acrylic acid, methacrylic acid, crotonic acid, itaconic acid and mixtures of the foregoing.

7. The process of claim 6 wherein the monomers bearing functional groups are present in an amount of about 0.1–25% by weight, based on the total weight of the stabilizer, and the other monomers used to form the stabilizer are present in an amount of about 99.9–75% by weight, based on the total weight of the stabilizer.

8. The process of claim 1 wherein the functional groups carried by the perfluoroolefin polymer are selected from the group consisting essentially of —COOH and —$SO_3H$.

9. The process of claim 1 wherein the organic liquid is mineral oil.

* * * * *